(12) United States Patent
McGuire, Jr. et al.

(10) Patent No.: US 10,671,072 B2
(45) Date of Patent: Jun. 2, 2020

(54) DRONE-RELATIVE GEOFENCE

(71) Applicant: TEAL DRONES, INC., Salt Lake City, UT (US)

(72) Inventors: William Kent McGuire, Jr., Kaysville, UT (US); Seth Bradley Porter, Saratoga Springs, UT (US); George Michael Matus, Salt Lake City, UT (US)

(73) Assignee: Teal Drones, Inc., Salt Lake City, UT (US)

( * ) Notice: Subject to any disclaimer, the term of this patent is extended or adjusted under 35 U.S.C. 154(b) by 266 days.

(21) Appl. No.: 15/920,737

(22) Filed: Mar. 14, 2018

(65) Prior Publication Data

US 2018/0267543 A1    Sep. 20, 2018

Related U.S. Application Data

(60) Provisional application No. 62/471,657, filed on Mar. 15, 2017.

(51) Int. Cl.
| | |
|---|---|
| *G05D 1/02* | (2020.01) |
| *B64C 39/02* | (2006.01) |
| *G05D 1/00* | (2006.01) |
| *G08G 5/00* | (2006.01) |
| *H04N 7/18* | (2006.01) |

(52) U.S. Cl.
CPC .......... *G05D 1/0202* (2013.01); *B64C 39/024* (2013.01); *G05D 1/0033* (2013.01); *G05D 1/0044* (2013.01); *G08G 5/006* (2013.01); *G08G 5/0021* (2013.01); *G08G 5/0069* (2013.01); *B64C 2201/027* (2013.01); *B64C 2201/108* (2013.01); *B64C 2201/141* (2013.01); *B64C 2201/146* (2013.01); *H04N 7/185* (2013.01)

(58) Field of Classification Search
CPC .. G05D 1/0202; G05D 1/0033; G05D 1/0044; B64C 39/024; G08G 5/0021; G08G 5/006; G08G 5/0069
See application file for complete search history.

(56) References Cited

U.S. PATENT DOCUMENTS

| | | | | |
|---|---|---|---|---|
| 2016/0107751 | A1* | 4/2016 | D'Andrea | B64C 27/32 701/4 |
| 2016/0306351 | A1* | 10/2016 | Fisher | H04W 4/026 |
| 2016/0340028 | A1* | 11/2016 | Datta | B64C 39/024 |
| 2017/0192418 | A1* | 7/2017 | Bethke | G05D 1/0094 |
| 2017/0198648 | A1* | 7/2017 | James | F02B 61/04 |
| 2018/0086483 | A1* | 3/2018 | Priest | B64F 1/22 |
| 2018/0201370 | A1* | 7/2018 | Yang | B64C 39/024 |
| 2018/0267543 | A1* | 9/2018 | McGuire, Jr. | G05D 1/0202 |
| 2019/0135411 | A1* | 5/2019 | Gonzalez | B64C 11/30 |
| 2019/0283874 | A1* | 9/2019 | Phan | B64C 39/024 |

* cited by examiner

Primary Examiner — Hussein Elchanti
(74) Attorney, Agent, or Firm — Workman Nydegger

(57) ABSTRACT

A drone receives an initiation signal which indicates that flight and/or navigation components of the drone are to be activated. Once activated, the drone then determines its initial position using a position-identifying radio signal. The drone then retrieves, from storage, dimensions of a drone-relative geofence. The drone can then calculate, using a processor, the drone-relative geofence having the dimensions with at least a specified floor and a specified radius. The drone adjusts the motor controller inputs to prevent the drone from exiting the calculated drone-relative geofence.

18 Claims, 5 Drawing Sheets

DRONE-RELATIVE GEOFENCE

CROSS-REFERENCE TO RELATED APPLICATIONS

This application claims priority to and the benefit of U.S. Provisional Application No. 62/471,657, filed on Mar. 15, 2017, entitled "DRONE-RELATIVE GEOFENCE," which is incorporated by reference herein in its entirety.

BACKGROUND

Unmanned aerial vehicles (UAVs) or drones have become increasingly popular in recent times. These drones can be controlled manually, or can fly autonomously according to a pre-programmed flight path. Because of these features, drones can be used in a variety of situations from work to recreation. For example, drones may be used to deliver objects from a warehouse to purchaser's residence. Drones may also be flown for fun such as in parks or backyards. Increasingly, drones are being flown in competitions, racing through predesigned courses.

Today's drones come with guidance systems that help them to know their location, altitude and trajectory. Various sensors and radios are used to detect the drone's height, speed, and current position. These sensors may be used to prevent the drone from flying into certain locations. For instance, drones may be prevented from flying near airports, stadiums or other locations where they may cause interference or harm. Such flight prevention boundaries are typically referred to as geofences. These geofence are stationary locations defined using global positioning system (GPS) coordinates. Upon reaching the boundary of a geofence, a drone's navigation system will stop it from flying beyond the walls of the geofence. In some cases, the drone may simply stop moving, and in other cases, the drone may be programmed to fly back to its launch location.

BRIEF SUMMARY

Embodiments described herein are directed to navigating a drone within a drone-relative geofence. In one embodiment, a drone receives an initiation signal which indicates that flight and/or navigation components of the drone are to be activated. Once activated, the drone then determines its initial position using a position-identifying radio signal. The drone then retrieves, from storage, dimensions of a drone-relative geofence. The drone can then calculate, using a processor, the drone-relative geofence having the dimensions with at least a specified floor and a specified radius. The drone adjusts the motor controller inputs to prevent the drone from exiting the calculated drone-relative geofence.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to navigating a drone within a drone-relative geofence. In one embodiment, a drone receives an initiation signal which indicates that flight and/or navigation components of the drone are to be activated. Once activated, the drone then determines its initial position using a position-identifying radio signal, and calculates, using a processor, a drone-relative geofence having specified dimensions with at least a specified floor and a specified radius that surrounds the drone in its current position. The geofence is considered "drone-relative" because it is not necessarily tied to a static geographic location, but instead is calculated with respect to the drone's current location. The drone adjusts its motor controller inputs to prevent the drone from exiting the calculated drone-relative geofence.

In at least one embodiment, calculating the drone-relative geofence also comprises calculating an initial placement of the drone-relative geofence. For example, if the drone-relative geofence is initiated prior to the drone taking off, it may not make sense to generate the drone-relative geofence to include the drone current position. Instead, the drone-relative geofence may be generated at least a specific set distance above the ground. Once the drone takes-off, the drone is automatically flown into the drone-relative geofence. Once inside the drone-relative geofence, the user can then control the drone within the confinement of the drone-relative geofence.

Figure 1:
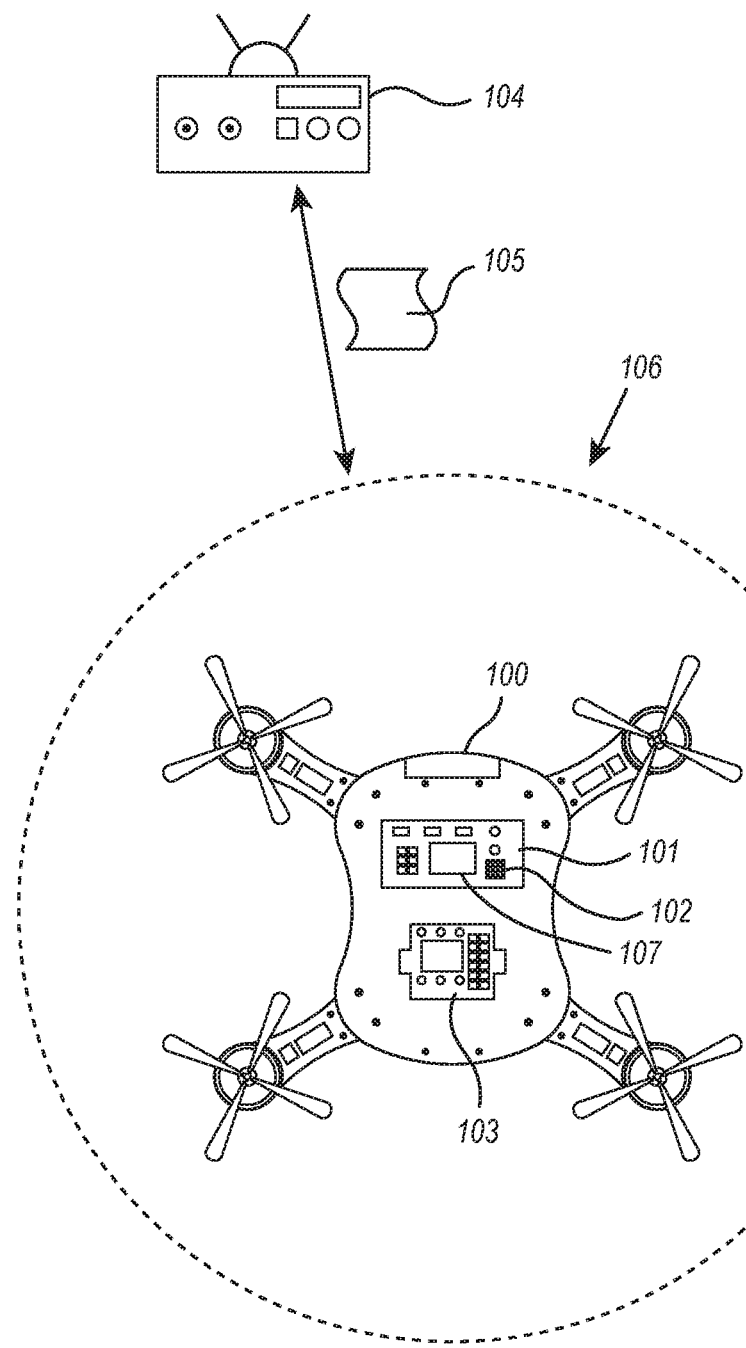
FIG. 1 illustrates an embodiment of a drone with its accompanying drone-relative geofence.

Referring to the figures, FIG. 1 illustrates a drone 100. The term "drone" will be used herein to refer to any type of unmanned aerial vehicle, whether operated manually by a human or automatically by a flight program. The drone 100 includes various hardware and software components that enable it to fly and receive feedback regarding its surroundings. For example, navigational components 102 may be used in conjunction with the processor 101 to determine the drone's current position and calculate its future positions along a flight path. The navigational components 102 may include position-identifying radios including global positioning system (GPS) radios, cellular radios, Wi-Fi radios, Bluetooth radios or other radios configured to receive coordinates from a transmitter. The navigational components may further include an altimeter, a barometer, wind speed sensors, cameras or other components that are configured to assist in navigating the drone.

The navigational components 102 provide sensor data and other information to processor 101, which interprets that data and uses it to generate control signals for the motor controllers 103. The motor controllers receive these control signals and control the various drone motors accordingly. In this manner, a drone can determine its current location, identify a flight path, and activate the motors accordingly.

The navigation components 102 may also be configured to receive inputs from users via a remote 104. For example, a user may use a mobile device or dedicated remote control to send signals to the drone 100, including initiating signal 105. The initiation signal may indicate to the drone that certain calculations are to be performed, including determining a current position and providing power to the motors. Various navigational components may be used to determine the drone's current altitude and heading (if moving), as well as feedback regarding its surroundings (e.g. from camera feed data).

The drone's processor 101 may be configured to calculate a drone-relative geofence 106. The drone-relative geofence 106 is a three-dimensional area, defined by dynamic geographical coordinates, that surrounds the drone 100. The drone-relative geofence 106 may be substantially any shape or size, and may vary in shape or size depending on the situation. In at least one embodiment, the drone-relative geofence 106 is calculated in the shape of a sphere or a cylinder, with the drone 100 initially being substantially in the center of the sphere or cylinder, although the drone-relative geofence may be calculated such that the drone is not in the center. The drone-relative geofence 106 specifies an area, relative to the drone, outside of which the drone is not allowed to fly. Thus, in contrast to current solutions which typically define a static, location-centered geofence into which drones are not permitted to fly, the embodiments described herein present a dynamic, continuously calculated geofence that is calculated relative to the current position of the drone 100.

One will appreciate that due to the growing prevalence of drones, there are many cases when multiple drones may be used within the same general geographic area. In at least one embodiment, a communication radio 104 on the drone 100 is able to communicate information about its drone-relative geofence 106 to at least a portion of the multiple drones that are in the area. The communication may take the form of a multicast broadcast that is widely dispersed to any listening drone, such that the other drones are aware of the drone-relative geofence 106.

In at least one embodiment, the communication of the drone-relative geofence 106 takes the form of direct drone-to-drone communication. For example, the drone 100 may communicate directly to another drone (not shown) using an encrypted, or otherwise secure, channel. The two drones may then negotiate the drone-relative geofence 106. For example, the other drone may not be included within the drone-relative geofence 106, in such a case, the two drones may access a network stored map of the general geographic area. The map of the general geographic area may contain flying information that indicates areas in which drones can fly. The two drones may identify an area for the drone-relative geofence 106 that has the least amount of impact on the remaining flying space. As such, the other drone can fly freely over a large distance and not interfere with the drone-relative geofence 106.

In at least one embodiment, other drones may then choose to avoid the drone-relative geofence 106 or to adopt it, such that they are also prevented from leaving the drone-relative geofence 106. In the case that other drones are joining the drone-relative geofence 106, one or more of the drones may communicate and identify the particular location and arrangement of the drone-relative geofence 106. For example, if two drones are on opposite side of the park, they may mutually identify coordinates associated with the middle of the park. The two drones may then fly to the drone-relative geofence 106 at the agreed upon coordinates. As such, in at least one embodiment, both drones are identifying shared coordinates and shared drone-relative geofence configurations. In at least one embodiment, however, a single drone may determine both the coordinates and the configuration of the drone-relative geofence 106. The single drone may then invite other drones to enter the pre-determined drone-relative geofence 106.

Figure 2:
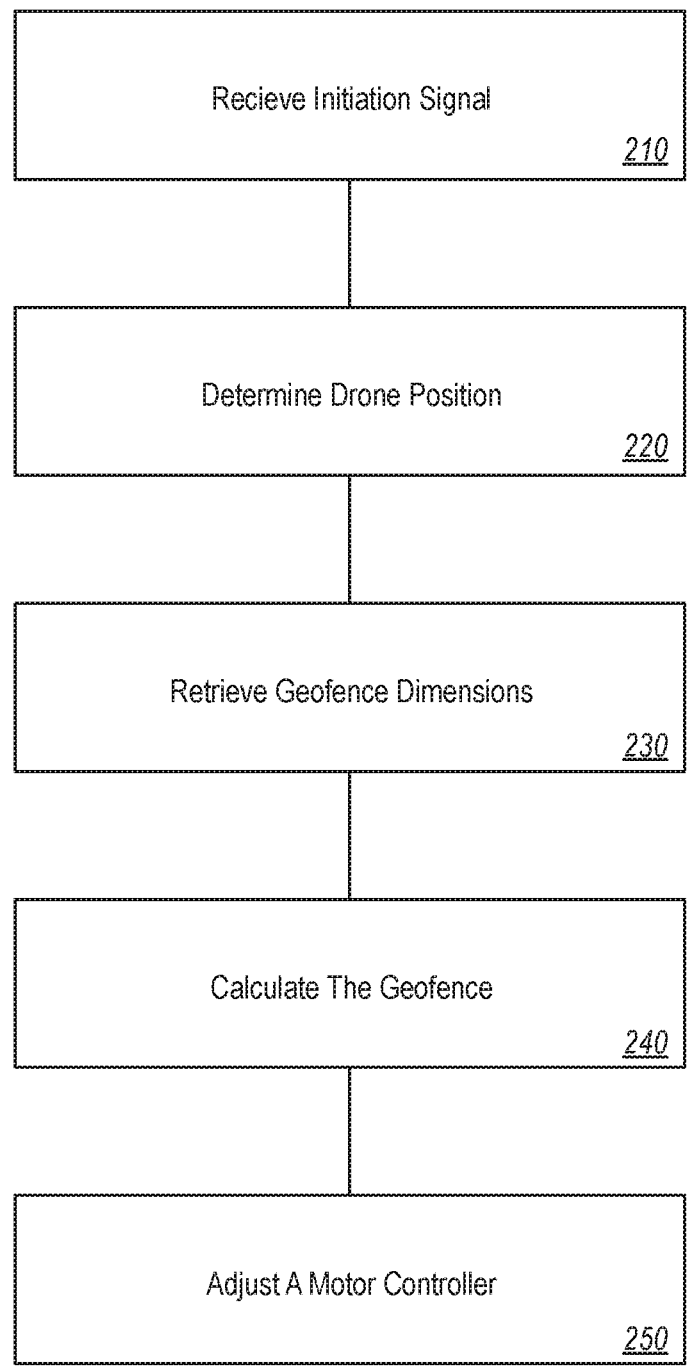
FIG. 2 illustrates a flowchart of an example method for navigating a drone within a drone-relative geofence.

In view of the systems and architectures described above, methodologies that may be implemented in accordance with the disclosed subject matter will be better appreciated with reference to the flow chart of FIG. 2. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for navigating a drone within a drone-relative geofence. The method 200 will now be described with frequent reference to the drone 100 of FIG. 1.

Method 200 includes act 210 of receiving an initiation signal at the drone, the initiation signal indicating that one or more flight and navigation components of the drone are to be activated. For example, the drone 100 has at least one communication radio 107 configured to receive signals such as initiation signal 105 from remote 104. Upon receiving the initiation signal 105, the drone may "arm" or prepare its navigational systems and motors for flight.

Method 200 next includes an act 220 of determining an initial position for the drone, using at least one position-identifying radio signal received at a position-identifying radio. The processor 101 may use data received from GPS radios or other position-identifying radios to determine the drone's initial position, including latitude, longitude and altitude. This determination of position occurs continually throughout the drone's flight. Location awareness is used not only to navigate the drone, but also to ensure that the drone does not run into other drones that may be flying in the same area or on the same flight path.

Method 200 also includes an act 230 of retrieving, from storage, dimensions of a drone-relative geofence. The drone-relative geofence encloses the drone 100 within a positioning-system-defined continuous three-dimensional shape. The processor 101 can access local storage or network-connect storage to gather dimensions for a drone-relative geofence 106. In at least one embodiment, the drone-relative geofence 106 does not initially enclose the drone 100, but once the drone 100 begins to the fly, the drone 100 is flown into the drone-relative geofence 106.

Figure 3:
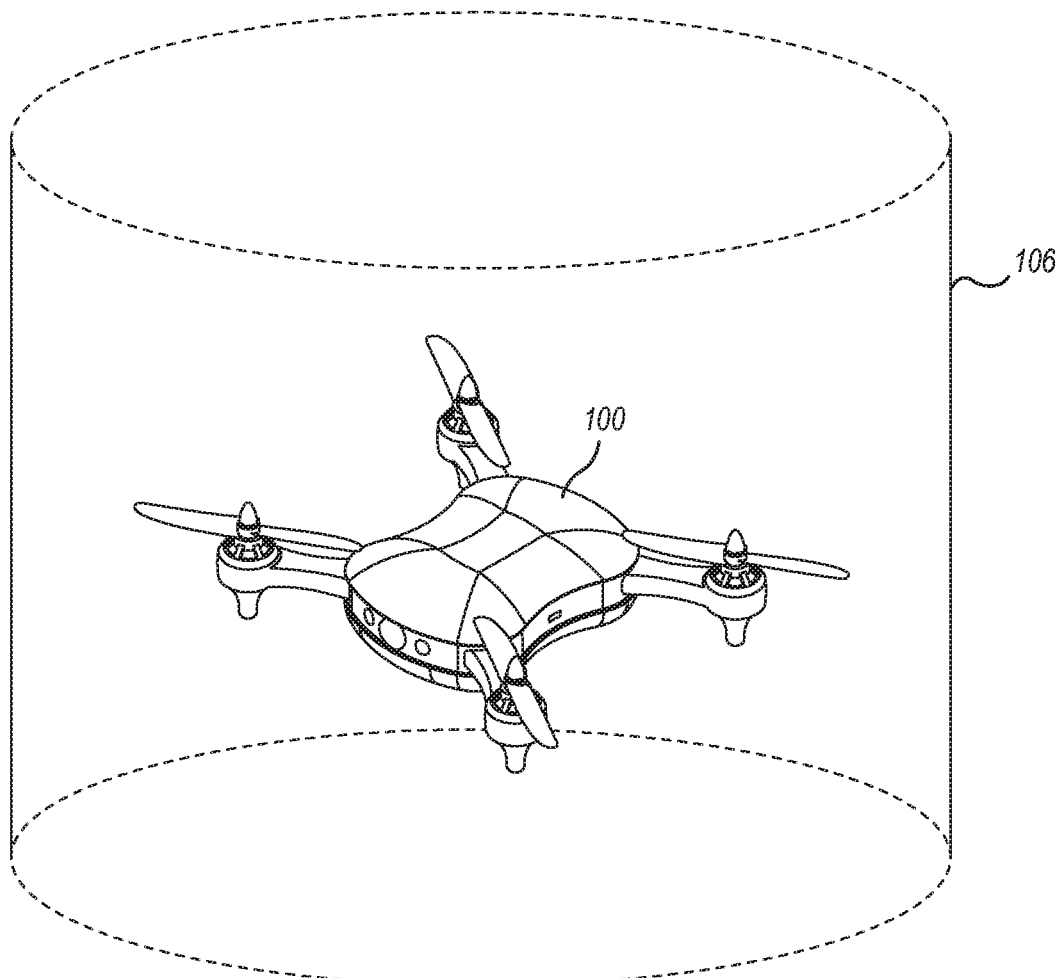
FIG. 3 illustrates an embodiment of a cylindrical drone-relative geofence surrounding a drone.

Method 200 additionally includes an act 240 of calculating, using a processor, a drone-relative geofence having specified dimensions with at least a specified floor and a specified radius. The processor 101 uses the drone's initial location information calculated in step 220 to calculate the drone-relative geofence 106. As shown in FIG. 1, the drone-relative geofence 106 may be spherical, or as shown in FIG. 3, the geofence may be cylindrical. In cases where the geofence is spherical, the size of the sphere may be calculated with the drone in the center and projected outward. Thus, the outer edge of the geofence would be equal in distance regardless of direction. In cases where the geofence is cylindrical, the "floor" of the cylinder may be a specified distance below the drone and may be of a specified diameter. This diameter may extend upwards to the ceiling, which itself is a specified distance above the drone. Regardless of shape or size, the drone-relative geofence 106 is continually recalculated as the drone moves through the air.

Method 200 further includes an act 250 of adjusting one or more motor controller inputs to prevent the drone from exiting the drone-relative geofence 106. Once the drone-relative geofence 106 is calculated, the motor controllers 103 are actuated in a manner that ensures that the drone does not fly outside of the geofence. This may substantially increase the safety of the drone, especially when it flies in locations where other drones are present. For example, if each drone, in a location such as a park, is calculating its own drone-relative geofence 106, and is communicating that geofence to the other drones, then during flight, each drone would be able to avoid traveling into the geofence of another drone. This would greatly reduce drone crashes, whether accidental or intentional. Indeed, the drones may be programmed to automatically adjust the motors upon determining that two calculated geofences overlap, and thereby avoid contact.

The drone-relative geofence 106 may have fixed or relative dimensions. For example, in the cylindrical geofence 106 of FIG. 3, the floor may have a specified height and diameter. The height of the geofence, however, may be specified relative to the floor height and radius size. Thus, if the floor height and diameter were large, the ceiling height would also be large, and so on. Any or all of the dimensions of the geofence may be fixed or dynamic and may change in flight. In some embodiments, the ceiling height may be equivalent to the floor distance from center plus the diameter of the geofence. In other embodiments, a user may define the floor, ceiling, or diameter of the geofence. Although the drone 100 is typically the center for determining the floor, ceiling and diameter, an alternative center may also be used.

When flying, the processor 101 may receive telemetry data from the navigation components 102 indicating altitude, speed, heading, current latitude and longitude, etc. The processor 101 may determine that the drone is within a threshold distance of at least one edge of the drone-relative geofence 106. For instance, as the drone is not permitted to travel outside of the drone-relative geofence 106, the processor 101 may determine that, based on current speed and heading, the drone will be within a few inches of the edge of the geofence. Indeed, many drones are capable of high rates of speed, and if the geofence is small, reaching the edge may be easily achieved, whether intentionally or accidentally. The motor controllers 103 may then be adjusted move the drone back to the center of the drone-relative geofence, or to stop the drone in place, or to at least slow it down to prevent it from traveling outside its geofence.

For example, in at least one embodiment, the processor 101 may determine a current velocity at which the drone 100 is traveling. The processor 101 may also determine a distance between the drone and an edge of the drone-relative geofence 106. The processor 101 can then calculate a minimum stopping distance for the drone 100 based upon the current velocity. If the processor 101 determines that the stopping distance exceeds the distance between the drone 100 and the edge of the drone-relative geofence 106, the processor adjusts the one or more motor controller inputs to slow the drone 100 down such that the minimum stopping distance no longer exceeds the distance between the drone and the at least one edge of the drone-relative geofence. As such, the processor 101 controls the drones 100 velocity to ensure that it does not fly outside of the drone-relative geofence 106.

In some cases, the drone may be flown manually by a user until it moves into within a threshold distance of an edge of the drone-relative geofence 106. Upon reaching this threshold, the drone may then be automatically transitioned into an autonomous mode to avoid hitting the edge of the drone-relative geofence. The geofence may be enabled prior to takeoff or may be enabled once the drone is in the air. Furthermore, the drone may also be prevented from enabling the geofence in the air if desired.

When establishing the boundaries of the drone-relative geofence 106, the floor may be determined using a GPS measurement relative to the current location of the drone. The altitude of the drone may be determined using a barometer or an altimeter. Additionally or alternatively, other sensors may be used including time of flight sensors, optical flow sensors, and various other types of sensors that are configured to point downwards to give a true height position. These sensors operate over obstacles, hills, or other terrain, maintaining a constant floor distance from the ground, as opposed to a floor based solely on altitude.

The diameter of the geofence may be specified by a user or by the manufacturer of the drone or may be dynamically changeable based on the situation. For instance, some parks or other recreational areas may require a minimum diameter drone-relative geofence. Similarly, the diameter of the geofence may change as the speed of the drone increases or decreases. At faster speeds, for example, the diameter may increase to allow these faster speeds, while at slower speeds, the diameter of the geofence may be smaller.

The speed and current location of the drone may be determined using GPS radio signals from GPS satellites. These GPS radio signals are received at a specified update frequency. If a drone is traveling at a high rate of speed, and if the diameter of the drone-relative geofence 106 is not sufficiently large, the drone may pass the edge of the geofence before the next GPS update signal is received. The drone's processor 101 may thus be configured to calculate, based on the GPS update frequency and the drone's current speed, whether the drone might reach the edge of the drone-relative geofence 106 prior to receiving the next GPS update. If such is the case, the motor controllers 103 may be adjusted to slow or stop the drone to ensure that is remains within the drone-relative geofence 106. In some cases, the drone may be configured to remain on the edge of the drone-relative geofence for at least a specified amount of time before returning to center.

In addition to or as an alternative to using GPS for position updates, inertial navigation systems may be used to identify the drone's current position and change in position. Inertial navigation inputs may be fused with GPS and other types of location data to provide quick position estimates. In some embodiments, for example, optical flow may be used to calculate position estimations alongside GPS coordinates to improve position accuracy. Other position determining methods may be used in addition to or as an alternative to those listed herein.

If the drone is at the edge of a drone-relative geofence 106 and is receiving user inputs from the remote 104 indicating that the drone is to continue in that direction, the motor controllers 103 may be configured to throttle the received manual user controls indicating that the drone is to continue forward. Thus, the processor 101 may override user inputs in some cases in order to prevent the drone from traveling outside of the drone-relative geofence 106. When throttling is performed, the drone speed may be reduced relative to the distance travelled by the drone between GPS updates. For instance, if GPS updates occur every second, and the drone will travel outside of the geofence 106 during that one second interval, the speed of the drone may be reduced so that the distance travelled in that one second is less than the distance to the edge of the geofence. Thus, in this manner, the rate of throttling may be dynamically variable, and may change based on the speed of the drone and the frequency of the GPS updates.

In some embodiments, a user may specify which action is to occur upon reaching an edge of the drone-relative geofence 106. For example, actions that may be taken by the drone include stopping, returning to center, returning to center and landing, or flying to another specified location. Other actions are also possible. Thus, if the drone reaches an edge of the geofence 106, it will stop moving forward (or upward or downward) and will return to center and land, if that is the action specified by the user. In some cases, the drone action taken may be situationally chosen, while in other cases, the same action will be performed each time, regardless of the situation. Users may use controls or settings, to control how the drone will respond in certain situations and may further control other elements including the radius of the drone-relative geofence 106, the minimum flight height, flight modes and other settings.

Figure 4:
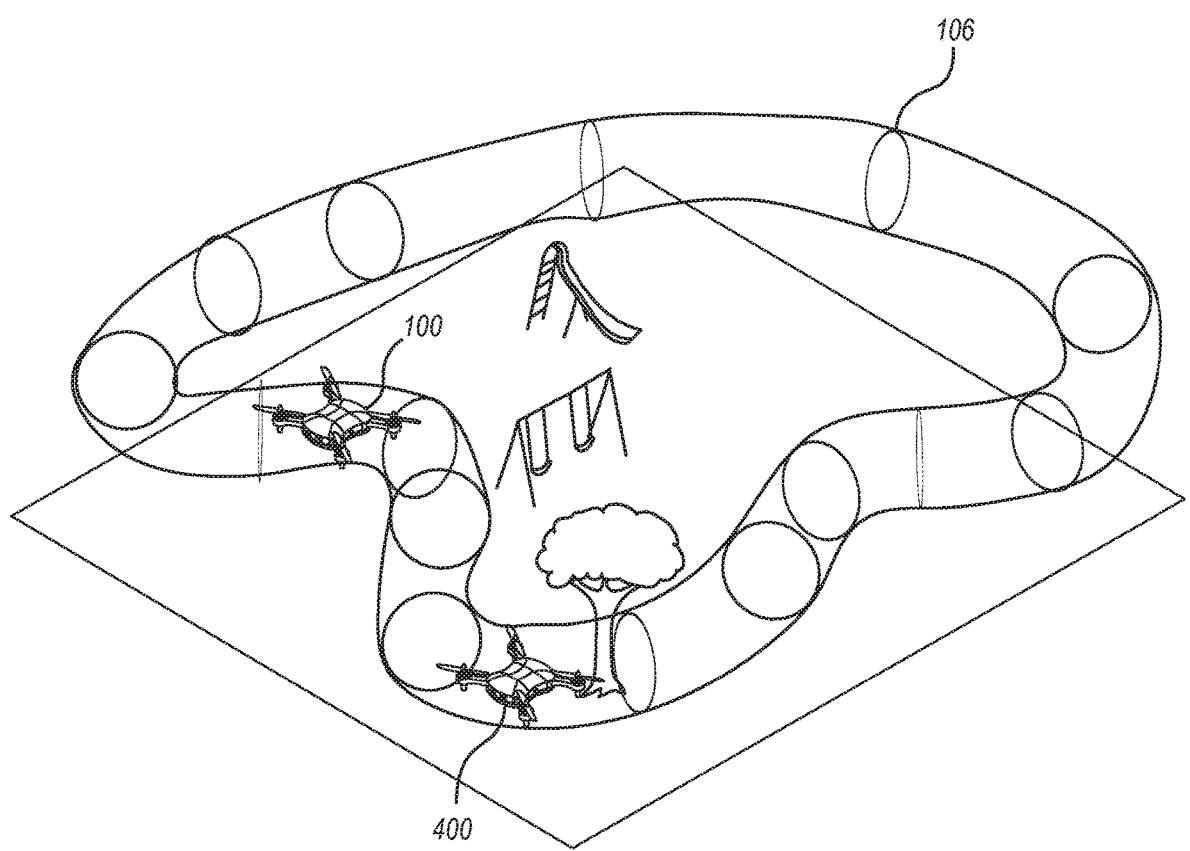
FIG. 4 illustrates an embodiment of a drone-relative geofence in a public park.

As depicted in FIG. 4, the drone-relative geofence 106 need not only be immediately surrounding the drone. Indeed, embodiments are contemplated herein in which the drone-relative geofence 106 is tube-shaped, coinciding with a specified pre-planned route. Thus, for example, if a drone had a pre-planned route that it was going to fly, or if a race course were set up and had a path along which the drone was to be manually flown, the drone-relative geofence 106 may extend through and around an area like a tube. The drone 100 may fly along and through this virtual tube, with the drone-relative geofence 106 ensuring that the drone 100 does not fly outside of this tube. In the case of a race, the drone-relative geofence 106 also establishes the race course itself for the drone 100 and any competitor drone 400. This may enhance the safety of participants at a drone race, and may further ensure that racing drones do not collide.

The shape and size of each drone's drone-relative geofence 106 may be transmitted to other drones (e.g., drone 400). In some cases, each drone 100, 400 will broadcast its geofence to other drones, while in other cases, a central controller or transmitter that is external to the drones may relay the geofences of surrounding drones. The transmission may include an indication of the shape and size of each drone's drone-relative geofence. In at least one embodiment, the transmission also includes coordinates indicating where the drone-relative geofence 106 should be located.

In some embodiments, multiple drones may share a large, single drone-relative geofence, allowing each of the drones in a given space to fly within the shared drone-relative geofence. Thus, one drone may be designated as the center drone, and the large, shared drone-relative geofence will be centered around that drone. As it moves, the shared geofence will move with it, and the drones will be permitted to move within that geofence. In some cases, they may be permitted to dogfight within the shared drone-relative geofence. Drones outside of the shared drone-relative geofence are prevented from entering within the shared geofence. Alternatively, a stationary drone or beacon may be used to establish the large, shared geofence.

Even within the shared geofence, each drone may still have and operate its own drone-relative geofence. In this manner, each drone can automatically determine whether its drone-relative geofence overlaps with another drone-relative geofence from another drone or whether it overlaps with the shared geofence. Using this information, the drone can adjust the motors to avoid leaving the geofence or interfering with another drone's geofence.

Figure 5:
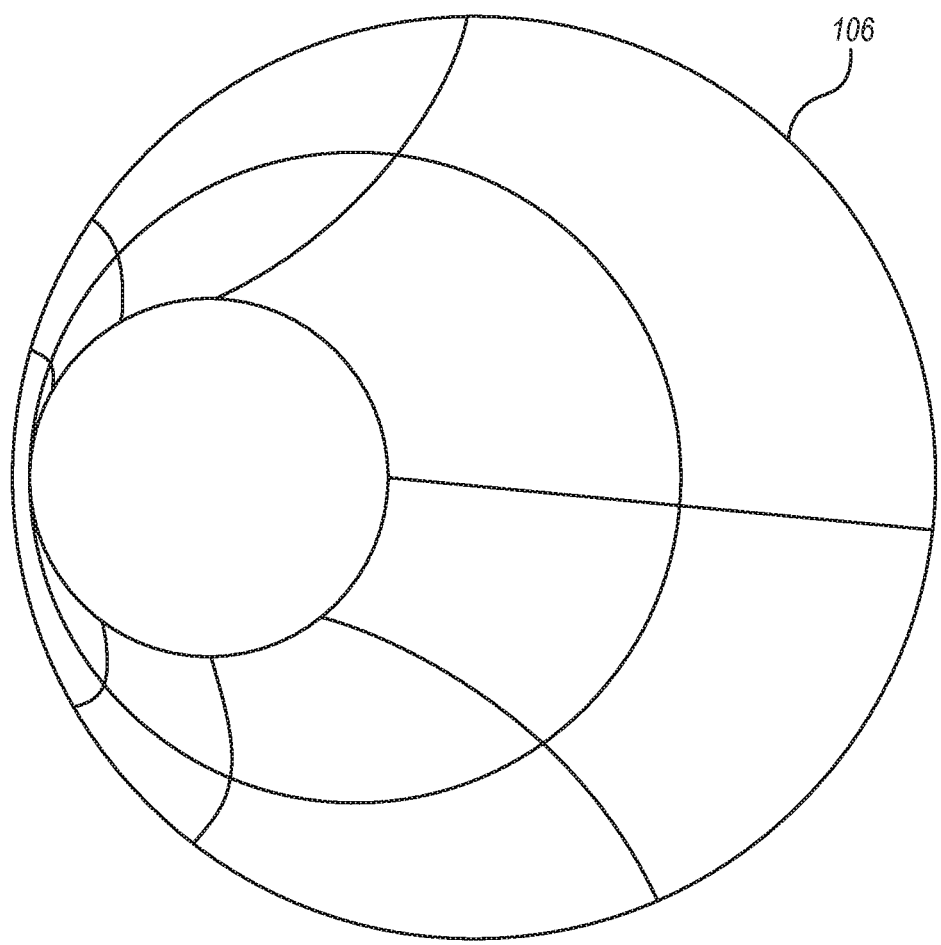
FIG. 5 illustrates an embodiment of a user's view of a drone-relative geofence 106 through a virtual reality headset.

In some embodiments herein, the drone 100 or a separate computing system may be configured to generate a visual representation of the drone within the drone-relative geofence. For example, as depicted in FIG. 5, this visual representation of the drone-relative geofence 106 may be shown on a traditional computer monitor or display device, or may be shown in a virtual reality (VR) or augmented reality (AR) device. The computer screen/VR/AR display may show a representation of the drone (an actual image or a drawing thereof) and a representation of the drone-relative geofence 106. Thus, a user can see, in real-time, how the drone is flying in relation to its surroundings, and in relation to the drone-relative geofence 106. As shown in Figure, in at least one embodiment, the representation of the drone-relative geofence 106 is depicted from the perspective of a camera on the drone 100. In contrast, in at least one embodiment, the user is able to view the drone in flight and VR/AR goggles will display the drone-relative geofence 106 to the user. When viewing the representation, haptic feedback may be provided to a manual controller when the drone comes within a specified distance of the edge of the drone-relative geofence. This haptic feedback, along with the visual representation, assists the operator in flying the drone safely within the drone-relative geofence.

Accordingly, disclosed embodiments teach a system for creating and managing drone-relative geofences. Each drone-relative geofence 106 may comprise unique attributes and behaviors. Each drone-relative geofence 106 provides a space which the drone 100 is not allowed to leave. Such a configuration provides a safe place in which a drone 100 can be flown without fear of injury or damage. Additionally, a shared drone-relative geofence 106 can be used for games such as racing. One will appreciate the advantages that the described technical advances provide to an end user.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web-based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for navigating a drone within a drone-relative geofence, the method comprising:

receiving an initiation signal at the drone, the initiation signal indicating that one or more flight and navigation components of the drone are to be activated;

determining an initial position for the drone, using at least one position-identifying radio signal received at a position-identifying radio;

retrieving, from storage, dimensions of a drone-relative geofence, wherein the drone-relative geofence encloses the drone within a positioning-system-defined continuous three-dimensional shape;

calculating, using a processor, the drone-relative geofence having the dimensions with at least a specified floor and a specified radius;

adjusting one or more motor controller inputs to prevent the drone from exiting the drone-relative geofence;

determining a current velocity at which the drone is traveling;

determining a distance between the drone and at least one edge of the drone-relative geofence;

calculating a minimum stopping distance for the drone based upon the current velocity; and when the minimum stopping distance exceeds the distance between the drone and the at least one edge of the drone-relative geofence, adjusting the one or more motor controller inputs to slow the drone down such that the minimum stopping distance no longer exceeds the distance between the drone and the at least one edge of the drone-relative geofence.

2. The method of claim 1, further comprising:
determining that the drone is:
within a threshold distance of at least one edge of the drone-relative geofence, and
moving towards the at least one edge of the drone-relative geofence; and
adjusting the motor controller inputs to move the drone back to a center of the drone-relative geofence.

3. The method of claim 1, wherein the drone-relative geofence comprises a tunnel-shape that longitudinally follows a specified pre-planned route.

4. The method of claim 3, wherein the pre-planned route comprises a race course.

5. The method of claim 3, further comprising transmitting the shape and size of the drone-relative geofence to one or more other drones.

6. The method of claim 5, wherein at least a portion of the one or more other drones are prevented from entering the drone-relative geofence.

7. The method of claim 1, further comprising automatically determining that the drone-relative geofence does not overlap the drone-relative geofence from another drone.

8. The method of claim 1, further comprising generating a virtual-reality visual representation of the drone within the drone-relative geofence.

9. The method of claim 1, further comprising communicating haptic feedback to a manual controller upon the drone coming within a specified distance of at least one edge of the drone-relative geofence.

10. A computer system for navigating a drone within a drone-relative geofence, comprising:
one or more processors; and
one or more computer-readable media having stored thereon executable instructions that when executed by the one or more processors configure the computer system to perform at least the following:
receive an initiation signal at the drone, the initiation signal indicating that one or more flight and navigation components of the drone are to be activated;
determine an initial position for the drone, using at least one position-identifying radio signal received at a position-identifying radio;
retrieve, from storage, dimensions of a drone-relative geofence, wherein the drone-relative geofence encloses the drone within a positioning-system-defined continuous three-dimensional shape;
calculate the drone-relative geofence having the dimensions with at least a specified floor and a specified radius;
adjust one or more motor controller inputs to prevent the drone from exiting the drone-relative geofence;
determining a current velocity at which the drone is traveling;
determining a distance between the drone and at least one edge of the drone-relative geofence;
calculating a minimum stopping distance for the drone based upon the current velocity; and
when the minimum stopping distance exceeds the distance between the drone and the at least one edge of the drone-relative geofence, adjusting the one or more motor controller inputs to slow the drone down such that the minimum stopping distance no longer exceeds the distance between the drone and the at least one edge of the drone-relative geofence.

11. The computer system of claim 10, wherein the executable instructions include instructions that are executable to configure the computer system to:
determine that the drone is:
within a threshold distance of at least one edge of the drone-relative geofence, and
moving towards the at least one edge of the drone-relative geofence; and
adjust the motor controller inputs to move the drone back to a center of the drone-relative geofence.

12. The computer system of claim 10, wherein the drone-relative geofence comprises a tunnel-shape that longitudinally follows a specified pre-planned route.

13. The computer system of claim 12, wherein the pre-planned route comprises a race course.

14. The computer system of claim 12, further comprising transmitting the shape and size of the drone-relative geofence to one or more other drones.

15. The computer system of claim 14, wherein at least a portion of the one or more other drones are prevented from entering the drone-relative geofence.

16. The computer system of claim 10, wherein the executable instructions include instructions that are executable to configure the computer system to automatically determine that the drone-relative geofence does not overlap the drone-relative geofence from another drone.

17. The computer system of claim 10, wherein the executable instructions include instructions that are executable to configure the computer system to generate a virtual-reality visual representation of the drone within the drone-relative geofence.

18. A drone configured to navigate within a drone-relative geofence, the drone comprising:
a drone body comprising one or more processing units and a position-identifying radio; and
wherein the one or more processing units have stored thereon executable instructions that when executed by the one or more processors configure the drone to perform at least the following:
receive an initiation signal at the drone, the initiation signal indicating that one or more flight and navigation components of the drone are to be activated;

determine an initial position for the drone, using at least one position-identifying radio signal received at the position-identifying radio;

retrieve, from storage, dimensions of a drone-relative geofence, wherein the drone-relative geofence encloses the drone within a positioning-system-defined continuous three-dimensional shape; calculate the drone-relative geofence having the dimensions with at least a specified floor and a specified radius;

adjust one or more motor controller inputs to prevent the drone from exiting the drone-relative geofence;

determining a current velocity at which the drone is traveling;

determining a distance between the drone and at least one edge of the drone-relative geofence;

calculating a minimum stopping distance for the drone based upon the current velocity; and when the minimum stopping distance exceeds the distance between the drone and the at least one edge of the drone-relative geofence, adjusting the one or more motor controller inputs to slow the drone down such that the minimum stopping distance no longer exceeds the distance between the drone and the at least one edge of the drone-relative geofence.

* * * * *